United States Patent [19]
Otto

[11] 3,970,155
[45] July 20, 1976

[54] ELECTRONIC TORQUE WRENCH

[75] Inventor: William M. Otto, Orange, Calif.

[73] Assignee: Jo-Line Tools, Inc., Anaheim, Calif.

[22] Filed: July 11, 1975

[21] Appl. No.: 595,135

Related U.S. Application Data

[62] Division of Ser. No. 433,247, Jan. 14, 1974, Pat. No. 3,895,517.

[52] U.S. Cl. .................................................. 73/139
[51] Int. Cl.$^2$ ........................................ B25B 23/14
[58] Field of Search ....................... 73/88.5 R, 139; 324/99 D; 177/DIG. 3

[56] References Cited
UNITED STATES PATENTS

| | | | |
|---|---|---|---|
| 3,649,826 | 3/1972 | Larsson et al. | 324/99 D X |
| 3,662,845 | 5/1972 | Pratt | 177/DIG. 3 |
| 3,713,136 | 1/1973 | Nagy, Jr. | 324/99 D X |
| 3,812,923 | 5/1974 | Rock | 177/DIG. 3 |
| 3,828,255 | 8/1974 | Schuon | 324/99 D X |

*Primary Examiner*—Charles A. Ruehl
*Attorney, Agent, or Firm*—Fulwider, Patton, Rieber, Lee & Utecht

[57] ABSTRACT

An electronic torque wrench including a strain measuring bridge circuit disposed to measure the bending strain of the handle thereof, a NAND gate circuit connected to alternately excite the bridge according to the switching state thereof, a differential circuit connected to receive the bridge balance signal, an integrator connected to integrate a selected polarity output signal from said differential circuit, a clock-driven counter connected to be inhibited for a predetermined time interval following each time the integrating circuit output signal changes polarity providing selected binary level output signals to switch the NAND gate circuit according to the state thereof and a logical switching circuit connected to the selected binary level output signals of said counter for alternatively connecting either the output signal from the differential circuit or a fixed reference signal to the integrator.

6 Claims, 2 Drawing Figures

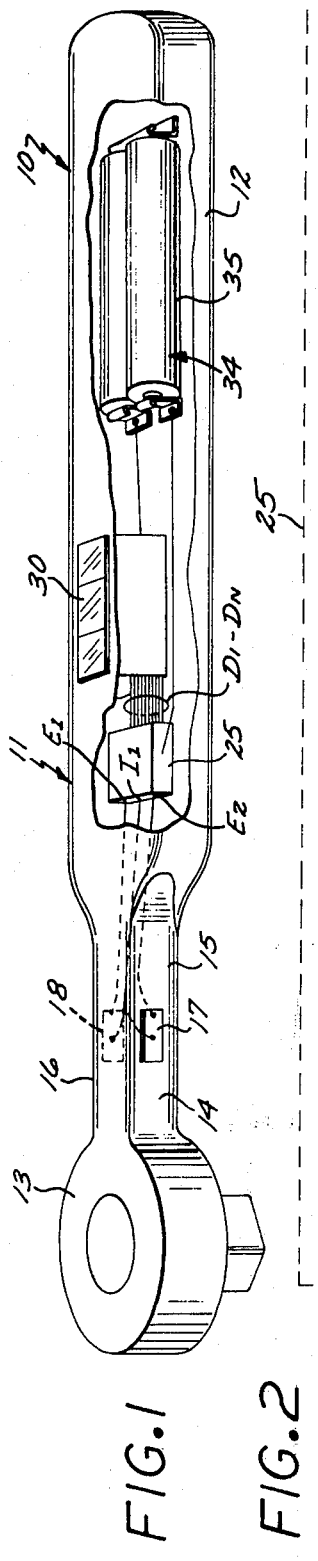
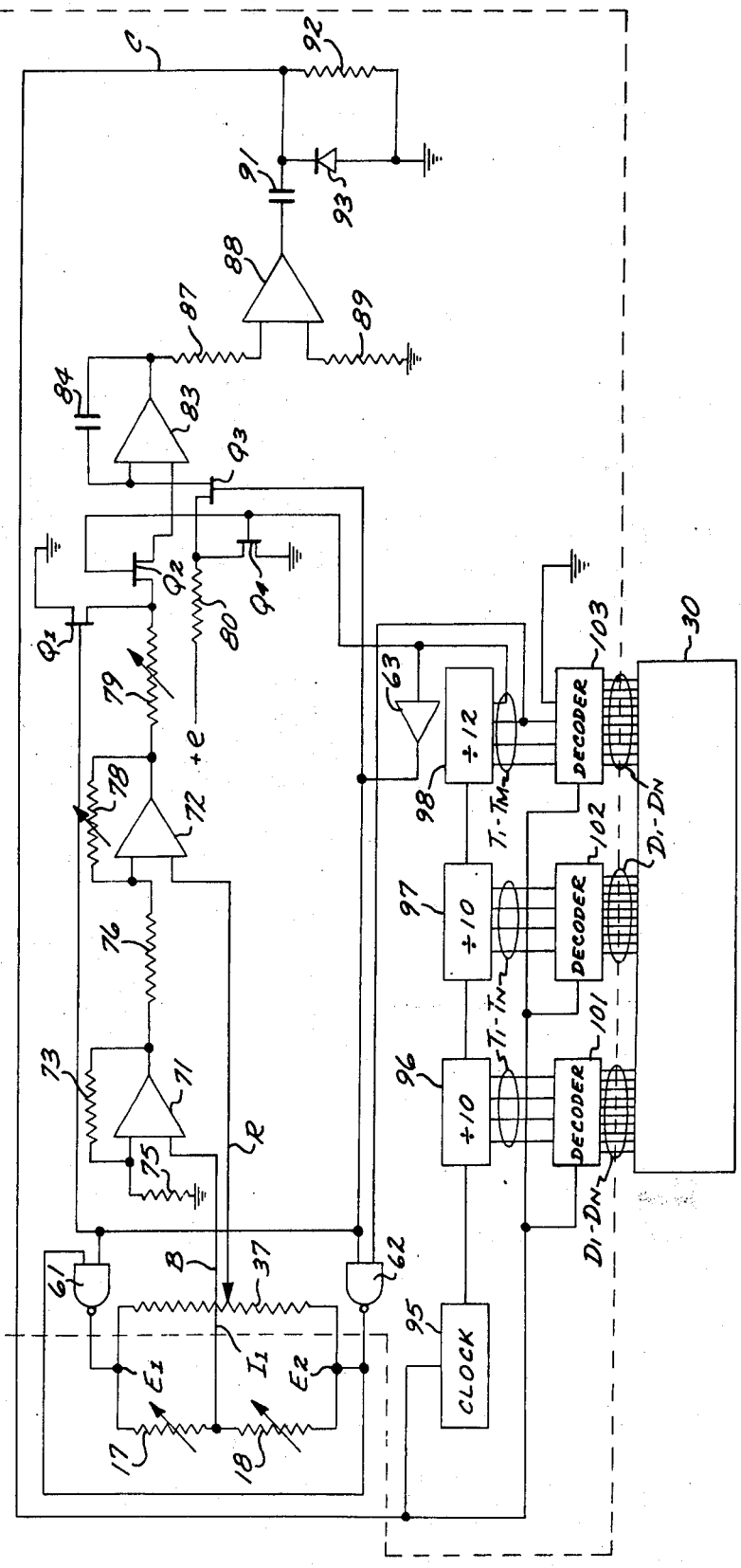
FIG.1
FIG.2

ELECTRONIC TORQUE WRENCH

CROSS-REFERENCE TO RELATED APPLICATION

The present application is a divisional of U.S. Ser. No. 433,247, filed Jan. 14, 1974, for ELECTRONIC TORQUE WRENCH, now U.S. Pat. No. 3,895,517. The benefit of the earlier filing date is claimed for the subject matter common to both applications.

BACKGROUND OF THE INVENTION

1. Field of the Invention

The present invention relates to strain measurement apparatus, and more particularly to digitally switched resistive strain measurement apparatus in combination with a torque wrench.

2. Description of the Prior Art

The measurement of strain in portable tools has had extensive application. In particular, tools like torque wrenches have acquired increasing significance in assembly procedures of complex technological devices, where increasingly precise torque reading requirements are demanded. Furthermore, the assemblies of such complex structures, which typically increase in size with development of technology, require that tools like torque wrenches possess the characteristics of portability and reliability due to the repetitive use thereof. Thus, it is the increasingly complex structures that have created a need for an accurate, reliable and portable hand tool like a torque wrench. Heretofore, most prior art torque wrenches were either of the mechanical type depending on visual observation of mechanical strain or of the electrical type where the strain is converted to an electrical signal. In the latter type, large amounts of power were typically dissipated through the strain measuring elements during operation since most often the strain measuring circuits are powered upon manual actuation of a switch, such power being dissipated continuously whether the torque wrench is applying torque or whether it is unloaded. The requirement of portability in the torque wrench has therefore been largely complicated by such power loss since the power would either have to be directly supplied to the wrench or would have to be carried within the structure of the wrench in the form of a battery. This dissipation of power through resistive strain measuring elements of the typical prior art torque wrenches further complicate the accuracy of the reading since a thermal gradient can exist in these configurations resulting in errors in strain readout.

SUMMARY OF THE INVENTION

Accordingly, it is the general purpose and object of the present invention to provide an electrically measured torque wrench where the electrical power dissipated therethrough is functionally dependent on the torque applied. Other objects of the invention are to provide a portable electronic torque wrench which is compact, requiring small levels of power, and which furthermore provides a digital readout indicative of the torque applied.

Briefly, these and other objects are accomplished within the present invention by providing a torque wrench having disposed on the laterally opposed surfaces of the handle thereof two resistive strain gages, such strain gages being connected in circuit to form one leg of a resistive bridge in parallel with a resistive divider circuit forming the bridge reference leg, the bridge being alternatively powered at the opposite connections thereof according to the switching of a complementary NAND gate circuit. The resulting alternating bridge unbalance output signal is collected in an absolute value differential circuit to be converted to a single polarity differential output which is integrated over a fixed interval of time. The resulting integrated signal is then driven back to zero at a fixed rate to provide a measured interval of time indicative of the torque applied. In this manner, the integrator is always driven back to zero eliminating the need for a reset circuit. The measured return interval is connected to a clock-driven counter which provides a digital count corresponding to the time interval necessary to bring the differential signal back down to zero. This same counter is utilized to provide the fixed time interval. A polarity detector connected to the output of the integrator provides an inhibit signal held for a delay interval to periodically disable the counter, during which time a readout is made. To further provide for a single polarity output reading in response to a dual polarity torque input, the bridge excitation is gated by the complementary NAND gate circuit where the NAND gates thereof switch in complement at the completion of one-half of the fixed interval count and then at the completion of the full interval count. Since the differential circuit is responsive to signals of one polarity only, a selected one-half of the fixed interval produced signal is integrated.

BRIEF DESCRIPTION OF THE DRAWINGS

FIG. 1 is a perspective view of a torque wrench constructed according to the present invention; and FIG. 2 is a circuit schematic illustrating one circuit embodiment of a block diagram illustrated in FIG. 1.

DESCRIPTION OF THE SPECIFIC EMBODIMENT

The present invention is directed at digital strain readout devices for indicating the strain deformation of a mechanical structure like a torque wrench. By way of the above-referenced prior application, Ser. No. 433,247, now allowed, the scope of the invention was extended to other measuring instruments and it is the intent to direct this application to the particular combination adapted for torque wrench use.

As shown in FIG. 1, a torque wrench assembly 10 includes a torque wrench 11, having a tubular handle 12 extending from a beam section 15 formed proximate a wrench head 13, the beam section 15 forming laterally opposed exterior mounting surfaces 14 and 16 for mounting two transversely opposed resistive strain gages 17 and 18. Strain gages 17 and 18 are conventional resistive strain gages adapted to register in the form of resistance changes the deformation of the corresponding surfaces 14 and 16 and therefore the structural bending of the beam section having such strain gages affixed thereon. In order to compensate for any asymmetries, the strain gages 17 and 18 are mounted in opposing relationship, transversely across the beam section 15, in paired complement, being connected in common at one end to form one leg of a resistive bridge. An electronic assembly 25 is contained within the central cavity of the tubular handle 12 connected at terminals I1, E1 and E2 to the common connection between gages 17 and 18 and to the distal ends thereof respectively. Terminals E1 and E2 are shunted within the assembly 25 by the other leg of a bridge described in detail below. At the output side the electronics assembly 25 connects across a plurality of leads D1-Dn to a digital readout 30, such digital readout comprising a plurality of light emitting diode readouts such as the FND-70 model series produced by Fairchild Semiconductor, 313 Fairchild Drive, Mountain View, California. Included further in handle 12 is a power supply assembly 34, comprising a stack of dry cell batteries 35 for developing a D.C. electrical signal.

As shown in more detail in FIG. 2, the common connection between the resistive strain gages 17 and 18 provides a signal lead B to the input terminal I1. A resistive divider circuit 37 is connected within assembly 25 across the strain gages 17 and 18, between terminals E1 and E2, to form the other or the reference leg of a resistive bridge circuit. The excitation signal to the bridge is therefore developed across the terminals E1 and E2 while the bridge unbalance formed by the resistive change in the strain gages 17 and 18 in parallel with the set resistive divider circuit 37 provides a bridge unbalance signal difference between the signal B and a signal R picked off at the wiper of a potentiometer forming the divider leg 37 according to the amount of strain deformation exhibited on the beam section 15 of a polarity dependent on the excitation polarity across terminals E1 and E2.

The excitation polarity of the bridge formed by the strain gages 17 and 18 and the resistive divider 37 is determined by the complementary polarity of the outputs of NAND gates 61 and 62, such output signals providing the excitation to terminals E1 and E2, respectively, where the output of NAND gate 62 is fed back to one of the input terminals of NAND gate 61. The other input of NAND gate 61 is connected in common with one input of NAND gate 62 to be driven according to the output state of an inverter 63 which receives a signal at the input terminal thereof switched according to means further described hereinbelow. An alternating polarity bridge unbalance signal is therefore developed between signals B and R, corresponding in magnitude to the strain differential registered by strain gages 17 and 18, which is received in common at the non-inverted input terminals of two operational amplifiers 71 and 72. Amplifiers 71 and 72 are conventional high gain operational amplifiers having the attendant conventional input and output impedance characteristics. One such amplifier is the amplifier designated as Model Series uA749, again produced by Fairchild Semiconductor, configured without an output pulldown resistor. The inverting input of amplifier 71 is connected to the output thereof by a feedback resistor 73 and to ground across a resistor 75. The inverting terminal of amplifier 72 is in turn connected to the output terminal of amplifier 71 across an input resistor 76 and similarly across a feedback resistor 78 to the output thereof. Thus the operational amplifiers 71 and 72 form a differential configuration controlled in gain by the corresponding feedback resistors 73 and 78. In order to provide a gain matching feature the feedback resistor 78 is adjustable. Amplifiers 71 and 72 as connected without external output pulldown resistors do not pass negative signals. Thus only bridge unbalance signals of a selected polarity are produced at the outputs thereof. The output signal from amplifier 72 is then passed across a variable resistor 79 to be alternatively connected to ground across a field effect transistor Q1 gated to a conductive state by a high output of the inverter 63, or to be series connected to the non-inverting terminal of an operational amplifier 83 across a field effect transistor Q2 gated to a conductive state in common with a high input to the inverter 63. Inverter 63 operates according to the conventional Boolean NOT and the input and output signals thereof are consequently complementary. Operational amplifier 83 includes a feedback capacitor 84 connected to the inverting input terminal, thus being conformed to operate as an integrator. Thus transistors Q1 and Q2 comprise one switching stage gated in complement by the complementary state between the input and output of the inverter 63, and when the input to the inverter or gate 63 is high, transistor Q2 conducts allowing the integrator to integrate the voltage developed at the output of resistor 79. The inverting terminal of the integrating operational amplifier 83 is connected to the reference voltage $e$ across current limiting resistor 80 in series with a field effect transistor Q3. Transistor Q3 is again gated to conduct according to the high state at the output of the inverter 63. Simultaneously, a field effect transistor Q4, connected between the output of resistor 80 and ground, is rendered non-conductive by the complementary low state of the input signal to inverter 63. Thus the input and output signals of inverter 63 alternatively control the complementary connection of the output of amplifier 72 to the non-inverting input of amplifier 83 and the reference signal $e$, across resistor 80, to the inverting terminal thereof. Accordingly, the integrating amplifier 83 alternatively integrates the amplified bridge unbalance signal of a selected polarity or decays at a fixed rate according to the signal passed across the resistor 80. Since the excitation of the bridge and the signal produced out of resistor 80 are both functionally tied to the voltage of signal $e$, the time increment necessary to decay any integrated bridge unbalance is substantially independent of the value of signal $e$, thus making the torque measurement independent of the charge status of the batteries 35.

The output of the operational amplifier 83 is connected across an input resistor 87 to the inverting terminal of yet another operational amplifier 88, while the non-inverting terminal of amplifier 88 is connected to ground across a resistor 89. Amplifier 88 is connected in open loop, having no feedback elements, such that the operation thereof conforms to the operation of a conventional polarity detector, switching to a high state when the output of the integrator, i.e. amplifier 83, approaches ground. The output of amplifier 88 is connected across a capacitor 91 to one end of a resistor 92 which at the other end connects to ground, forming a time delay of a duration dependent on the value of capacitor 91 and resistor 92. Resistor 92 is shunted by a diode 93, in reverse bias, such that a high to low transistion on the output of amplifier 88 is directly conducted by capacitor 91 without effecting the time constant. Thus each time the output of amplifier 88 goes from low to high a time constant is initiated which is not cut off by a high to low transistion. The output of capacitor 91 thereby provides a periodic inhibit signal C to be utilized by elements further described below.

The periodic inhibit signal C is fed to the inhibit terminal of a clock oscillator 95 which can be any clock circuit capable of momentary inhibit and is best described as a relaxation oscillator. The pulse train output of the clock oscillator 95 is fed to a counter circuit which, again, is specifically illustrated as three conventional four-bit binary counters 96, 97 and 98 connected in cascade. According to conventional practice, each such counter can be configured to cascade into the next stage at any desired count level and in order to conform to the decade convention in displaying numerical readouts, counters 96 and 97 are configured as decade counters, counter 96 successively cascading into counter 97 each time a count of 10 is reached. Counter 98 provides the most significant bit levels of the counter stages and furthermore provides the switching signals to gates 62 and 63. Thus depending on the scale required, counter 98 can be configured in any conventional manner, shown in this instance as a divide-by-twelve counter. The most significant bit level of counter 98 is connected in common to both inputs of gate 63 and to the bases of transistors Q2 and Q4. When a count is reached in counter 98 such that the most significant bit changes state from low to high, transistors Q2 and Q4 are rendered non-conductive and the fixed rate of decay is initiated in the integrator circuit including amplifier 83. This decay rate is maintained until the detector circuit registers a zero, at which time the inhibit signal C goes high inhibiting the clock oscillator 95.

According to the previous description only positive values are possible at the outputs of amplifiers 71 and 72. Since the polarity of the bridge unbalance is dependent both on the direction of the torque applied and on the excitation polarity of the bridge circuit, the bit level immediately below the most significant bit of level of counter 98 is trunked off to provide the second input to NAND gate 62. Thus, there are three states of excitation possible as result of the interconnection of gates 61 and 62 and the foregoing connections of counter 98, i.e. both NAND gate outputs are high, gate 61 is high with complementary low output of gate 62, and gate 62 is high in complement with a low output at gate 61. A fourth state or concurrent low output from gates 61 and 62 is precluded by virtue of the gate 62 output to gate 61 input interconnection.

The respective counters 96, 97 and 98 are connected by leads Tl-Tm from the respective bit levels to corresponding decoders 101, 102 and 103, such as Fairchild Model No. 7447 BCD to seven segment decoders. Decoders 101, 102 and 103 are further connected to signal C to be rendered operative when C goes high which at the same time inhibits the clock oscillator 95. Thus decoders 101, 102 and 103 provide a readout each time the count is stationary, or each time the output signal value of amplifier 83 goes to zero.

It is to be noted that counters 96 and 97 are conventional four-bit binary counters which will normally cascade into the next counter level upon the completion of a full count. In any conventional binary-to-decimal code conversion a selected bit combination is required in order to achieve such cascading. Thus if a straight binary-to-decimal conversion is made it is necessary to modify the cascade interconnection, one such modification being accomplished by two stages of AND gates including a first gate connected to receive the least and most significant bit of the counter, while a second AND gate is connected to receive the output of the first AND gate, and the bit level immediately above the least significant bit level of the associated counter. The output of the second AND gate is then connected, in cascade, to the input of the next counter stage. Alternatively, the four-bit counters may be modified internally to accommodate other binary-to-decimal codes where a code conventionally referred to as the 2421 code will render the conventional configuration of all highs immediately prior to carry. In this instance a conventional four-bit counter configured to produce the conventional BCD or 8421 code is utilized for counters 96 and 97, such being available from Fairchild Semiconductor and sold under the Model No. 7490.

The corresponding decoders 101 and 102 for the counters described above follow the conventional 8, 4, 2, 1 decoder configuration producing the requisite seven segment signals Dl-Dn.

As stated hereinabove, signals Dl-Dn are respectively connected to associated light emitting diodes 110 each connected to illuminate a selected segment of the readout.

In operation, the initial count in the counter stages 96, 97 and 98 is zero; the voltage at the output of the integrating amplifier is initially close to zero, being placed in this state by the previous decay cycle. Upon the expiration of the delay interval indicated by a high to low transition in the signal C, the clock oscillator 95 is enabled beginning a fixed count until the most significant bit in counter 98 changes state, thus integrating the voltage developed at the output of amplifier 72 over a fixed interval of time. In order to provide integration of an absolute number for both directions of torque applied the bit level immediately adjacent to the most significant bit level provides for complementary switching of gates 61 and 62 inverting the bridge excitation such that a positive bridge unbalance signal is available for one-half of the fixed count interval. Upon reaching the count interval, i.e. upon switching the most significant bit level of counter 98 to high, all bridge excitation is removed by the inverting gate 63 which in this instance provides a low to both gates 61 and 62 thereby driving both respective outputs thereof to a high (or 1) according to the Boolean AND x NOT. Simultaneously, amplifier 72 is disconnected from amplifier 83 by the transistors Q1 and Q2 and a fixed voltage is applied to the opposite terminal of amplifier 83 to begin a fixed decay rate. When the output of amplifier 83 goes to zero, signal C goes high when inhibits the clock 95 and enables the decoders 101, 102 and 103. The decoders then illuminate appropriate segments of the readout corresponding to the count developed.

Some of the many advantages of the present invention should now be readily apparent. The invention provides a convenient means for measuring strain in hand tools without the necessity of an accurate power supply. Furthermore, such measurement can be made for strains of either polarity without the necessity of switching.

Obviously, many modifications and variations of the present invention may be made with regard to the foregoing detailed description without departing from the spirit of the invention.

I claim:
1. A torque wrench comprising, in combination:
a wrench head;
a handle structure including an internal cavity at one end thereof and a beam section secured to said wrench head at the other end thereof;
a battery insertable into said internal cavity;
a pair of strain gages respectively attached to the opposed lateral surfaces of said beam section including a first and second resistive element connected in series and adapted to register strain deformation of said beam section in the form of resistive change;

resistive means connected across said first and second resistive elements to form a bridge circuit in combination therewith;

excitation means connected to said bridge circuit and to said battery for electrical excitation of said bridge circuit in a first and second polarity;

switching means connected to said excitation means for alternatively selecting said first or second excitation polarity according to the state of a received switching signal;

a clock circuit connected to said battery for producing a sequence of timed pulses;

counting means connected to said clock circuit for producing a plurality of binary signals indicative in combination to the accumulated count of said pulses;

gate means connected to selected ones of said binary signals for producing said switching signal corresponding to the status thereof;

connecting means connected to said bridge circuit, to said battery and to said counting means for alternatively passing a bridge balance signal produced by said bridge circuit or a fixed signal from said battery, selected according to the status of selected other ones of said binary signal;

accumulating means connected to said connecting means for accumulating in a first direction said bridge balance signal and in a second direction said fixed signal connected to said counting means and said accumulating means; and readout means for displaying the accumulated count in said second direction.

2. Apparatus according to claim 1 wherein:
said readout means includes optical displays mounted in the exterior of said handle.

3. Apparatus according to claim 2 wherein:
said accumulating means includes differential amplifying means adapted to accumulate said bridge balance signal when said bridge balance signal is at a predetermined algebraic polarity.

4. Apparatus according to claim 3 further comprising:
reset means operatively connected to said battery and connected to said accumulating means and said connecting means for disabling said connecting means when the output signal of said accumulating means falls below a predetermined amplitude, whereby further current draw from said battery is prevented.

5. Apparatus according to claim 4 wherein:
said excitation, switching, counting, gate and accumulating means are received collectively within said cavity.

6. Apparatus according to claim 5 wherein:
said wrench head includes a ratchet drive.

* * * * *